United States Patent
Jiang et al.

(10) Patent No.: US 12,394,027 B2
(45) Date of Patent: Aug. 19, 2025

(54) DEBLURRING MOTION-BLURRED IMAGES USING MAP ESTIMATE AND ADAPTIVE PRIORS

(71) Applicant: RAYTHEON COMPANY, Tewksbury, MA (US)

(72) Inventors: Hong Jiang, North Andover, MA (US); Dave S. Douglas, Marana, AZ (US)

(73) Assignee: RAYTHEON COMPANY, Tewksbury, MA (US)

( * ) Notice: Subject to any disclaimer, the term of this patent is extended or adjusted under 35 U.S.C. 154(b) by 74 days.

(21) Appl. No.: 18/398,845

(22) Filed: Dec. 28, 2023

(65) Prior Publication Data

US 2025/0217942 A1 Jul. 3, 2025

(51) Int. Cl.
| | |
|---|---|
| H04N 23/68 | (2023.01) |
| G06T 5/73 | (2024.01) |
| G06V 10/44 | (2022.01) |
| G06V 10/60 | (2022.01) |

(52) U.S. Cl.
CPC .......... *G06T 5/73* (2024.01); *G06V 10/44* (2022.01); *G06V 10/60* (2022.01); *H04N 23/6811* (2023.01); *H04N 23/683* (2023.01)

(58) Field of Classification Search
None
See application file for complete search history.

(56) References Cited

U.S. PATENT DOCUMENTS

| | | | |
|---|---|---|---|
| 11,704,777 B2 | 7/2023 | Douglas et al. | |
| 2009/0324126 A1* | 12/2009 | Zitnick | G06T 5/73 382/275 |
| 2010/0183241 A1* | 7/2010 | Lin | G06T 5/73 382/270 |
| 2017/0316552 A1* | 11/2017 | Hanocka | G06T 5/73 |
| 2019/0139199 A1* | 5/2019 | Wang | G06T 5/30 |
| 2024/0056564 A1* | 2/2024 | Ollila | G06T 5/90 |

OTHER PUBLICATIONS

Kotera et al., "Blind Deconvolution Using Alternating Maximum a Posteriori Estimation with Heavy-Tailed Priors", Aug. 2013, Springer, Computer Analysis of Images and Patterns. CAIP 2013. Lecture Notes in Computer Science, vol. 8048, p. 59-66. (Year: 2013).*
Li, et al. "Learning a Discriminative Prior for Blind Image Deblurring", pp. 6616-6625.

(Continued)

*Primary Examiner* — Cynthia Segura
(74) *Attorney, Agent, or Firm* — CANTOR COLBURN LLP

(57) ABSTRACT

A method of deblurring an image taken by a moving imaging sensor. The method includes: receiving an image from the imaging sensor; collecting motion data indicative of motion of the sensor while capturing the image; applying successive approximations in deblurring based on certain features of the image; and applying a Maximum A Posteriori (MAP) deblurring process with adaptive priors to deblur the image and create a deblurred image, wherein the MAP deblurring process applies a first prior in certain regions and second prior in other regions.

19 Claims, 2 Drawing Sheets

(56) References Cited

OTHER PUBLICATIONS

Mallikarjunaswamy, et al. "Image region driven prior selection for image deblurring" Multimedia Tools and Applications (2023) 82:24181-24202, Published online: Jan. 27, 2023.

A. Gramfort, et al., "Identifying Predictive Regions from fMRI with TV-L1 Prior," 2013, 3rd International Workshop on Pattern Recognition in Neuroimaging, Philadelphia, PA, USA, 2013, pp. 17-20.

E. J. Candes and M. B. Wakin, "An Introduction To Compressive Sampling," in IEEE Signal Processing Magazine, vol. 25, No. 2, pp. 21-30, Mar. 2008.

EJ Candès, "Compressive sampling" Proceedings of the International Congressof Mathematicians, Madrid, Spain, 2006, 20 pages.

G. Marti, et al, "Why Maximum-A-Posteriori Blind Image Deblurring Works After All," 2021 29th European Signal Processing Conference (EUSIPCO), Dublin, Ireland, 2021, pp. 666-670.

Hong Jiang, et al. "Surveillance Video Processing Using Compressive Sensing" Inverse Problems and Imaging, 2012, 6(2): 201-214. doi: 10.3934/ipi.2012.6.201.

Li, Chengbo, et al. "An Efficient Augmented Lagrangian Method with Applications to Total Variation Minimization." (2012) https://hdl.handle.net/1911/102202, 26 pages.

Richard Charles Puetter, "Information, language, and pixon-based image reconstruction," Proc. SPIE 2827, Digital Image Recovery and Synthesis III, (Oct. 25, 1996), 21 pages.

S. Villena, et al., "Bayesian Super-Resolution Image Reconstruction Using an ι1 prior," 2009 Proceedings of 6th International Symposium on Image and Signal Processing and Analysis, Salzburg, Austria, 2009, pp. 152-157.

T. F. Chan, et al., "Total Variation Blind Deconvolution," IEEE Transactions on Image Processing, vol. 7, No. 3, pp. 370-375, Mar. 1998.

Liu, Qiaohong et al. "Nonblind Image Deblurring Based on Bi-Composition Decomposition by Local Smoothness and Nonlocal Self-Similarity Priors", IEEE Access, vol. 7, May 29, 2019, p. 63954-63971.

Notification of Transmittal of the International Search Report and the Written Opinion of the International Searching Authority, or the Declaration; PCT/US2024/061715; Apr. 7, 2025, 16 pages.

Rafael Molina et al. "Image Restoration in Astronomy—A Bayesian Perspective", IEEE Signal Processing Magazine, IEEE, USA, vol. 18, No. 2, Mar. 1, 2001, pp. 11-29.

Shaochun Li et al. "Noisy Radial Deblurring Using Natural Image Prior", Computer Science & Service System (CSSS), 2012 International Conference On, IEEE, Aug. 11, 2012, pp. 1880-1883.

Wang, Ruxin et al.: "Recent Progress in Image Deblurring", Aug. 11, 2014, Retrieved from the Internet: URL:https:// arxiv.org/pdf/1409.6838, 53 pages.

\* cited by examiner

DEBLURRING MOTION-BLURRED IMAGES USING MAP ESTIMATE AND ADAPTIVE PRIORS

BACKGROUND

Exemplary embodiments of the present disclosure pertain to the art of image processing and, in particular, to deblurring images using a Maximum A Posteriori (MAP) estimate with adaptive priors.

Motion induced blurring occurs in images captured by a sensing device that is moving at a fast speed relative to the sensor integration time. An example is an image taken by a camera mounted on a high-speed vehicle in flight. In such applications, although the motion of the vehicle is deterministic and known from telemetry, it may be nonlinear such as rotations.

The purpose of capturing the images is to detect and identify features such as targets and clutters, which becomes difficult with the presence of blurring due to the motion. Therefore, images are first deblurred before the detection and identification are performed. Deblurring of images with an item of interest (referred to as a target herein) in rotational motions is difficult due to the complexity of the blurring kernel. Added to the challenge is the presence of bright point sources near the target, which results in high-dynamic range (HDR) images in which the blurred target is near the noise floor of the imaging sensors.

While some deblurring techniques exist, improvements in the field of deblurring images and, in particular, HDR images, still exist.

BRIEF DESCRIPTION

Disclosed is a method of deblurring an image taken by a moving imaging sensor. The method includes: receiving an image from the imaging sensor; collecting motion data indicative of motion of the sensor while capturing the image; applying successive approximations in deblurring based on certain features of the image; and applying a Maximum A Posteriori (MAP) deblurring process with adaptive priors to deblur the image and create a deblurred image, wherein the MAP deblurring process applies a first prior in certain regions of the image and a second prior in other regions of the image.

In addition to one or more of the features described above, or as an alternative to any of the foregoing embodiments, the feature of the image used in the process of successive approximations can be brightness of a pixel in the image.

In addition to one or more of the features described above, or as an alternative to any of the foregoing embodiments an L1 prior can applied to the regions of the image that contain point sources or approximate point sources, and a total value (TV) prior is applied to other regions.

In addition to one or more of the features described above, or as an alternative to any of the foregoing embodiments, after a point source has been deblurred with the MAP estimate, the point source may be removed from any successive approximations.

In addition to one or more of the features described above, or as an alternative to any of the foregoing embodiments the MAP deblurring process include forming a MAP estimate of the form:

$$I^{MAP} = \arg\max_{I \in \mathbb{R}^N} p(z|I)p(I).$$

where p(I) is the probability density function of the array of pixels I being the original image and likelihood p(z|I) is the probability density function of the observation z given that the captured image is I.

In addition to one or more of the features described above, or as an alternative to any of the foregoing embodiments, wherein p(I) is either the $L_1$ or TV prior.

In addition to one or more of the features described above, or as an alternative to any of the foregoing embodiments, the TV prior can be expressed as $p(I)=e^{-\gamma\|\nabla I\|_1}$, $\gamma>0$, wherein $\nabla I$ is the array of differences of adjacent pixels.

In addition to one or more of the features described above, or as an alternative to any of the foregoing embodiments, the $L_1$ prior can be expressed as $p(I)=e^{-\gamma\|I\|_1}$, $\gamma>0$.

In addition to one or more of the features described above, or as an alternative to any of the foregoing embodiments, the method can also include converting the image from the imaging sensor to polar coordinates before applying successive approximations.

In addition to one or more of the features described above, or as an alternative to any of the foregoing embodiments, the method can also include converting the deblurred image from polar coordinates to planar coordinates.

Also disclosed is a system for deblurring an image. The system can include: an imaging sensor that records an image; a motion sensor that collects motion data indicative of motion of the sensor while recording the image; and a deblurring processor configured to perform any motion disclose above or otherwise herein.

The above systems/methods can be used to direct an vehicle based on the deblurred image.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
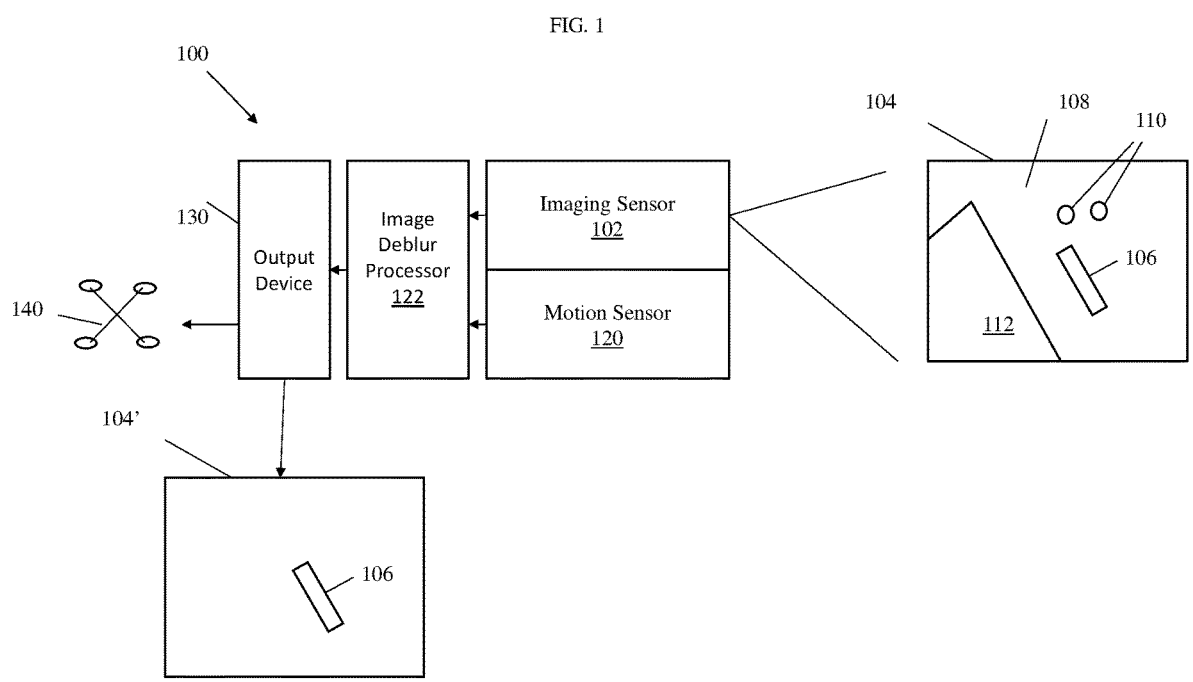
FIG. 1 is shows a block diagram of a system used to deblur an image according to one embodiment.

A detailed description of one or more embodiments of the disclosed apparatus and method are presented herein by way of exemplification and not limitation with reference to the Figures.

In some cases, an image may be received (sensed) by a sensor. Herein, an (unknown) image (I) is blurred due to motion. Target detection is difficult in a blurred image (z). The blurred image is observed and hence it is known. The motion, which causes the blurring, is also known from the telemetry. The general problem to be solved is given the blurred observation, and the motion to find an estimate of the original image.

As noted above, methods of deblurring images (and in particular, HDR images) exist but they may be limited. For example, traditional deblurring methods fail to accurately recover a particular item of interest (target) in the blurred image, either treating the target as noise to be suppressed, or creating artificial ripples which camouflage the target.

Disclosed herein is a method of deblurring images. Based on information in the deblurred image, the method can be used to change travel patterns (e.g., flight) of a vehicle. In one embodiment, the method can be utilized by a computing device on the vehicle or at another location. The device can be specifically programmed to alter the travel pattern based on information in the deblurred image or it can receive information from another device or person to make such an alteration.

To that end, embodiments are directed to image deblurring. The methods can include utilizing successive approximation by the MAP estimate with multiple and adaptive priors. In particular, an image is deblurred in iterations. At each iteration, the MAP estimate is tuned to accurately deblur pixels in the image of a given brightness. Once the pixels are deblurred, they are removed from future iterations, to prevent the noise in the deblurred pixels of higher brightness from contaminating the pixels of the lower brightness yet to be deblurred. The successive approximation is very effective for HDR images.

A prior in the MAP estimate makes an assumption about the original image (the image that results in the blurred image under the motion). For example, the $L_1$-prior assumes the original image to be sparse, and therefore, the MAP estimate with the $L_1$-prior favors a sparse image as the solution. Another prior, the total variation (TV) prior assumes that original image to be smooth, and is more useful with smooth subregions as explained further below.

In embodiments, either an $L_1$-prior or a TV-prior, or a combination of both, is used in the MAP estimate adaptively according to certain features of the image. The adaptive algorithm recovers features of different characteristics, e.g., point sources, which are sparse, vs targets, which are smooth, equally well in the deblurred images.

Further, in the case of blurring due to rotational motions, the disclosed method may utilize a transformation to polar coordinates so that the blurring operation can be expressed as a convolution with a kernel, reducing the computational complexity.

FIG. 1 shows an example of an imaging system 100 according to one embodiment.

The imaging system 100 includes an imaging sensor 102 operative to capture image data indicative of a scene 104. Any type of scene may be imaged and the example scene 104 of FIG. 1 includes a target 106 traversing a sky region 108 that includes one or more point sources 110. The point sources 110 can be stars in one embodiment and will be bright as compared to other regions of the sky region 108. The sky region 108 can be bounded by or adjacent to clutter 112.

A motion sensor 120 is operative to create motion data indicative of motion of the imaging sensor 102 while the imaging sensor is capturing the image data. A de-blur processor 122 is operatively connected to receive the image data from the image sensor 102 and to receive the motion data from the motion sensor 120. The de-blur processor 122 includes machine readable instructions configured to cause the de-blur processor 122 to carry out methods as described below.

The system 100 includes in one embodiment an output device 110 operatively connected to the de-blur processor 122 to output the de-deblurred image 112. The output can include one or more of displaying the de-blurred image 104' on a display and/or printing a hard copy of the de-blurred image 104'. Instead of displaying or printing the de-blurred image 104', it is also contemplated that the output device 120 can be a communication device connectable to physical resources such as described below, e.g. to redirect an unmanned arial vehicle (UAV) (e.g., a drone), steer an automobile, or the like, based on information or target(s) 106 in the de-blurred image 104'.

Figure 2:
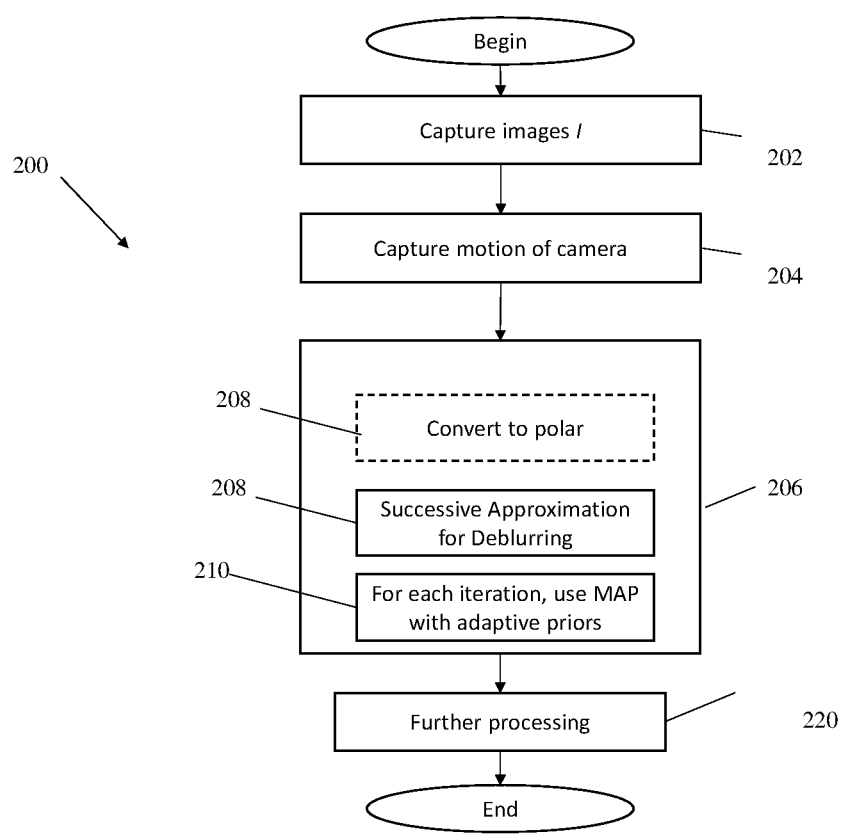
FIG. 2 is a flow diagram of method according to one embodiment.

With reference now to FIG. 2, a method 200 of de-smearing (de-smearing may be used interchangeably as deblurring) an image includes capturing image data from an imaging sensor (e.g., sensor 102 in FIG. 1) as indicated at block 202. Herein I will be the vector representation of the image and z will be the vector representation of the image captured by the sensors that includes blurring. It shall be understood that multiple images are being successively collected.

While the image is being captured, optionally, the motion of the imaging sensor can also be captured at block 204, That motion shall be referred to a A The image I is then deburred at block 206. Deburring can include first applying successive approximation where the pixels are deblurred in iterations. This can include deblurring pixels of higher brightness are deblurred first, and then deblurring the pixels of lower brightness.

At each iteration of block 208, pixels of a given range of brightness are deblurred by using MAP estimate with adaptive priors as indicated by block 210. In more detail, in block 210 for each iteration, either $L_1$ prior or TV priors are used in the MAP estimate according to some features of the pixels to be deblurred as more fully explained below. Typically, $L_1$ priors are used for deblurring bright point sources in a first iteration(s) and then TV prior are used to deblur the target and/or clutter.

As indicated in block 214, In the case of rotational motion, a transformation from cartesian coordinate to polar coordinate is performed before the operations of blocks 208, 210.

After the image is deblurred, the information from the image can be used in a further processing step 220 to, for example, redirect the motion of a UAV towards the target 106.

Each of these steps are more fully described below. Before beginning, a primer in the general process of using a MAP deburring is described. Then, the two types of priors used herein are described.

For MAP deblurring, as noted above, let/be a vector representation of an image. The image is unknown, but it can be observed, and its observation is known. Let z be the vector representation of the observation. The observation is the result of the image I subject to a linear blurring transform, A, plus a measurement noise, $\epsilon$. The blurring operator A can usually be represented by a convolution with a kernel, $\kappa$, which can be written as $A=A(\kappa)$. Let N be the number of pixels in the image. The relation between the image I and the observation z is given by:

$$z = A \cdot I + \epsilon, \quad I, z, \epsilon \in \mathbb{R}^N, A \in \mathbb{R}^{N \times N}. \quad (1)$$

The MAP estimate is to find estimates of the image I and the blurring operator A for the given observation z. More specifically, it is to find estimates of I and A that maximize a posteriori p(I, A|z), which is the joint probability density function of I, A given the observation z.

A posteriori p(I, A|z) can be computed by using Bayes' theorem as $$p(I, A|z) = \frac{p(z|I, A)p(I, A)}{p(z)} \propto p(z|I, A)p(I, A). \quad (2)$$

In Eq (2), the probability density functions p(z|I, A) and p(I, A) are the likelihood and prior, respectively. With this relationship, the MAP estimate is tantamount to finding the estimates of I and A that maximize p(z|I, A)p(I, A). This is usually implemented as an iterative process in which the estimates of I and A are computed alternatively. The process starts with an initial guess of A, and computes an estimate of I by maximizing the right-hand side of Eq (2) with the given A. Next, with the estimated I, a new estimate of A is computed by maximizing Eq (2) again but with I fixed. The MAP iteration is given as follows.

$$I^{(k+1)} = \underset{I \in \mathbb{R}^N}{\mathrm{argmax}} p(z|I, A^{(k)}) p(I, A^{(k)})$$

$$\kappa^{(k+1)} = \underset{\kappa}{\mathrm{argmax}} p(z|I^{(k)}, A(\kappa)) p(I^{(k)}, A(\kappa))$$

$$A^{(k+1)} = A(\kappa^{(k+1)})$$

$$k = 0, 1, 2, \ldots$$

In above, $A^{(0)}$ is an initial guess. Since the blurring operator A may be unknown and is part of solution, the above MAP algorithm is also called a blind deblurring algorithm.

If the blurring operator A is known, as in the application of interest herein due to the known telemetry of the sensor, there is no need to need to compute A, or its kernel κ, in the iteration, and the MAP algorithm is simplified as:

$$I^{MAP} = \underset{I \in \mathbb{R}^N}{\mathrm{argmax}} p(z|I) p(I). \qquad (3)$$

In the rest of this disclosure, reference to a MAP estimate is meant the estimate given in Eq (3). The MAP estimate Eq (3) requires computations of the likelihood p(z|I) and the prior p(I), which will be discussed next.

The prior p(I) is the probability density function of the array of pixels I being the original image; it requires the prior knowledge of the original image. In many applications, the images are sparse, having more zero pixels than non-zero pixels. An example prior for sparse images is the $L_1$ prior given by:

$$p(I) = e^{-\gamma \|I\|_1}, \gamma > 0. \qquad (4)$$

In Eq (4), $L_1$-norm is the sum of the absolute values of all pixels:

$$\|I\|_1 = \sum_{n=1}^{N} |I_n|.$$

The likelihood p(z|I) is the probability density function of the observation z given that the image is I. As can be seen from Eq (1), the likelihood depends on the probability model of the measurement noise ϵ. Herien it is assumed that the measurement noise has the normal distribution with zero mean, i.e., $\epsilon \sim \mathcal{N}(0, \delta^2)$. Then the observation also has the normal distribution with the mean A·I, i.e., $z \sim \mathcal{N}(A \cdot I, \delta^2)$. From this, the likelihood function p(z|I) is given by $$p(z|I) = e^{-\frac{1}{2\sigma^2} \|z - A \cdot I\|_2^2}.$$

Substituting the expressions of the likelihood and the prior into (4), the MAP estimate becomes solving the following optimization problem:

$$I^{MAP} = \underset{I \in \mathbb{R}^N}{\mathrm{argmax}} \, e^{-\frac{1}{2\sigma^2} \|z - A \cdot I\|_2^2 - \gamma \|I\|_1},$$

which can be rewritten as:

$$I^{MAP} = \underset{I \in \mathbb{R}^N}{\mathrm{argmin}} \left\{ \|I\|_1 + \frac{1}{\omega^2} \|z - A \cdot I\|_2^2 \right\}, \omega > 0. \qquad (5)$$

If the distribution of the noise ϵ is unknown, but a bound of its energy is known, i.e., if there is a known ω>0 such that $\|\mu \epsilon \mu_2 \geq \omega$, then the MAP estimate can be recast to:

$$I^{MAP} = \underset{I \in \mathbb{R}^N}{\mathrm{argmin}} \|I\|_1, \text{ subject to } \|z - A \cdot I\|_2 \leq \omega. \qquad (6)$$

Eq (6) can be interpreted as that the MAP estimate looks for a sparse image (having the minimum $L_1$-norm) which is consistent with the observation within the noise level ($\|z - A \cdot I\|_2 \leq \omega$).

In Eq (5) and Eq (6), the parameter ω can be adjusted based on the noise level in the observation. It controls the sensitivity of the deblurred image to the observation noise. The smaller it is, the more sensitive the deblurred image is to the noise. The $L_1$-prior in Eq (4) is appropriate for sparse images, e.g., images of night sky, but not all images are sparse.

An example where the $L_1$ prior may not be best suited for use is an image of a white board, in which none of the pixels is zero. For such image composed of smooth sub-regions a good prior is the total variation prior, which stipulates that the derivatives, or the edges, of an image are sparse. The TV-prior can be expressed as:

$$p(I) = e^{-\gamma \|\nabla I\|_1}, \gamma > 0. \qquad (7)$$

In Eq (7), $\nabla I$ is the array of differences of adjacent pixels. For example, if the image is represented as a 2D array, with pixels given by $I_{m,n}$, then:

$$\|\nabla I\|_1 = \sum_{\substack{1 \leq m < N \\ 1 \leq n < N}} \{|I_{m+1,n} - I_{m,n}| + |I_{m,n+1} - I_{m,n}|\}.$$

MAP estimate with the TV-prior results when the term $\|I\|_1$ is replaced by $\|\nabla I\|_1$ in Eq (5) or Eq (6), the below results:

$$I^{MAP} = \underset{I \in \mathbb{R}^N}{\mathrm{argmin}} \left\{ \|\nabla I\|_1 + \frac{1}{\omega^2} \|z - A \cdot I\|_2^2 \right\}, \omega > 0, \qquad (8)$$

$$I^{MAP} = \underset{I \in \mathbb{R}^N}{\text{argmin}} \|\nabla I\|_1, \text{ subject to } \|z - A \cdot I\|_2 \leq \omega. \quad (9)$$

It also possible to combine the two priors as follows.

$$I^{MAP} = \underset{I \in \mathbb{R}^N}{\text{argmin}} \left\{ \rho \|I\|_1 + (1-\rho)\|\nabla I\|_1 + \frac{1}{\omega^2}\|z - A \cdot I\|_2^2 \right\}, \quad (10)$$

$$0 \leq \rho \leq 1, \omega > 0,$$

$$I^{MAP} = \underset{I \in \mathbb{R}^N}{\text{argmin}} \{\rho\|I\|_1 + (1-\rho)\|\nabla I\|_1\}, 0 \leq \rho \leq 1, \quad (11)$$

$$\text{subject to } \|z - A \cdot I\|_2 \leq \omega.$$

The parameter ρ may be adaptively adjusted according to features in the image being deblurred. It controls the flatness of the deblurred image. The smaller it is, the flatter the deblurred image is.

More specifically, ρ can be a function of some local feature of the image, i.e., ρ=ρ(f(n)), where f(n) is the feature at the pixel n. The feature f(n) could be, for example, the local variation in neighboring pixels, given by:

$$f(n) = \sum_{k=-\frac{K_0}{2}}^{\frac{K_0}{2}} |z_{n-k+1} - z_{n-k}|.$$

In above, $K_0 > 0$ is some integer larger than the length of the blurring kernel, but much smaller than the total number of pixels. The parameter ρ=ρ(f) can then be defined as a monotonically increasing function of f. For example, given two threshold values $f_{min}$ and $f_{max}$ with $0 \leq f_{min} \leq f_{max}$, then define:

$$\rho(n) = \rho(f(n)) = \begin{cases} 0, & f(n) \leq f_{min} \\ \frac{f(n) - f_{min}}{f_{max} - f_{min}}, & f_{min} < f(n) \leq f_{max} \\ 1, & f(n) \geq f_{max} \end{cases}.$$

The following describes the successive approximation of block 208 accursing to one embodiment. It is noted that a straightforward implementation of the MAP estimate Eq (8) or Eq (9) may lead to poor results when deblurring images with high dynamic range (HDR). In an HDR image, pixels of low brightness may be completely buried under the errors introduced in deblurring a pixel of high brightness (e.g. a point source), and consequently, the pixels of low brightness cannot be deblurred properly.

To avoid spreading of deblurring errors from pixels of high brightness to those of low brightness, successive approximation can be implemented. In the successive approximation, an image is deblurred iteratively in which the pixels deblurred successively according to their brightness. The iteration starts with resolving the brightest pixels, and once they are computed, they are subtracted from the equation so that they do not participate in the subsequence steps.

Initially, let $I^{(0)} = 0$. Let k be the iteration index. At iteration k, $I^{(k)}$, k=0,1, . . . , is the current estimate of the deblurred image. Then the blurring operator A is applied to $I^{(k)}$ to obtain the blurred estimate, and the difference between it and the observation z:

$$z^{(k)} = A \cdot I^{(k)}, \Delta z^{(k)} = \chi_\theta(z - z^{(k)}, z), k = 0, 1, \ldots \quad (12)$$

In above, the function $\chi_\theta$ is a vector-valued function, each component of which is a scalar function acting on the corresponding component of its argument defined by (using the same notation, $\chi_\theta$, for both the vector-valued and the scalar functions)

$$\chi_\theta(x, y) = \begin{cases} x, & |x| \geq \theta y \\ 0, & |x| < \theta y \end{cases}, \theta > 0. \quad (13)$$

The function $\chi_\theta$ in Eq (13) is a thresholding function with the threshold θ. It is used in Eq (12) to remove the deblurred pixels whose relative error is less than the threshold θ from further processing.

The difference $\Delta z^{(k)}$ is used to solve the optimization problem to compute the increment of the next estimate, e.g., by solving Eq (6)

$$\Delta I^{(k+1)} = \underset{I \in \mathbb{R}^N}{\text{argmin}} \|I\|_1, \text{ subject to } \|\Delta z^{(k)} - A \cdot I\|_2 \leq \omega^{(k)}.$$

The new estimate is then computed as:

$$I^{(k+1)} = I^{(k)} + \Delta I^{(k)}, k = 0, 1, \ldots e$$

The parameters $\omega^{(k)}$, k=0,1, . . . , are chosen experimentally. Initially, $\omega^{(k)}$ is large, so that $I^{(k+1)}$ approximates the ground truth well at the bright pixels but has zeros values where the ground truth has small values. This is because when $\omega^{(k)}$ is large, the small pixel values are within the noise level and treated as noise and, hence, suppressed in the optimization. After the higher pixel values, which are already well estimated, are removed from the estimate process, $\omega^{(k)}$ is gradually decreased as iteration increases so that the lower pixel values are successively estimated. Tyicallyl, two or three iterations are sufficient.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of deblurring an image taken by a moving imaging sensor, the method comprising:
   receiving an image from the imaging sensor;
   collecting motion data indicative of motion of the sensor while capturing the image;
   applying successive approximations in deblurring based on certain features of the image; and
   applying a Maximum A Posteriori (MAP) deblurring process with adaptive priors to deblur the image and create a deblurred image, wherein the MAP deblurring process applies a first prior in certain regions of the image and a second prior in other regions of the image.

2. The method of claim 1, wherein the feature of the image used in the process of successive approximations is brightness of a pixel in the image.

3. The method of claim 1, wherein an L1 prior is applied to the regions of the image that contain point sources or approximate point sources, and a total value (TV) prior is applied to other regions.

4. The method of claim 3, wherein after a point source has been deblurred with the MAP estimate, the point source is removed from any successive approximations.

5. The method of claim 4, wherein the MAP deblurring process include forming a MAP estimate of the form:

$$I^{MAP} = \underset{I \in \mathbb{R}^N}{\mathrm{argmax}}\, p(z \mid I) p(I)$$

where p(I) is the probability density function of the array of pixels I being the original image and likelihood p(z|I) is the probability density function of the observation z given that the captured image is I.

6. The method of claim 5, wherein p(I) is either the $L_1$ or TV prior.

7. The method of claim 6, wherein the TV prior is expressed as $p(I) = e^{-\gamma|\nabla I/\mu_1|}$, $\gamma > 0$, wherein $\nabla I$ is the array of differences of adjacent pixels.

8. The method of claim 6, wherein the $L_1$ prior is expressed as $p(I) = e^{-\gamma_1|I/\mu_1|}$, $\gamma > 0$.

9. The method of claim 1, further comprising:
   converting the image from the imaging sensor to polar coordinates before applying successive approximations.

10. The method of claim 9, further comprising converting the deblurred image from polar coordinates to planar coordinates.

11. A system for of deblurring an image:
    an imaging sensor that records an image;
    a motion sensor that collects motion data indicative of motion of the sensor while recording the image; and
    a deblurring processor configured to;
       apply successive approximations of differences of intensity of adjacent pixels of the image; and
       applying a Maximum A Posteriori (MAP) deblurring process with adaptive priors to deblur the image and create a deblurred image, wherein the MAP deblurring process applies a first prior in certain regions and a second prior in other regions.

12. The system of claim 11, wherein the feature of the image used in the process of successive approximations is the brightness of a pixel in the image.

13. The system of claim 11, wherein an L1 prior is applied to the regions of the image that contain point sources or approximate point sources and a total value (TV) prior is applied to other regions.

14. The system of claim 11, wherein after a point source has been deblurred with the MAP estimate, the point source is removed from any successive approximations.

15. The system of claim 14, wherein the MAP deblurring process include forming a MAP estimate of the form:

$$I^{MAP} = \underset{I \in \mathbb{R}^N}{\mathrm{argmax}}\, p(z \mid I) p(I)$$

where p(I) is the probability density function of the array of pixels I being the original image and likelihood p(z|I) is the probability density function of the observation z given that the captured image is I.

16. The system of claim 15, wherein p(I) is either the $L_1$ or TV prior.

17. The system of claim 16, wherein the TV prior is expressed as $p(I) = e^{-\gamma_1|\nabla I/\mu_1|}$, $\gamma > 0$ wherein $\nabla I$ is the array of differences of adjacent pixels.

18. The system of claim 16, wherein the $L_1$ prior is expressed as $p(I) = e^{-\gamma_1 I/\mu_1}$, $\gamma > 0$.

19. The system of claim 11, wherein the deblurring processor is further configured to:
    convert the image from the imaging sensor to polar coordinates before applying successive approximations; and
    convert the deblurred image from polar coordinates to planar coordinates.

* * * * *